April 3, 1928.
L. PERILLI
1,664,570
PROPELLING MECHANISM FOR VEHICLES
Original Filed Sept. 15, 1923   4 Sheets-Sheet 1
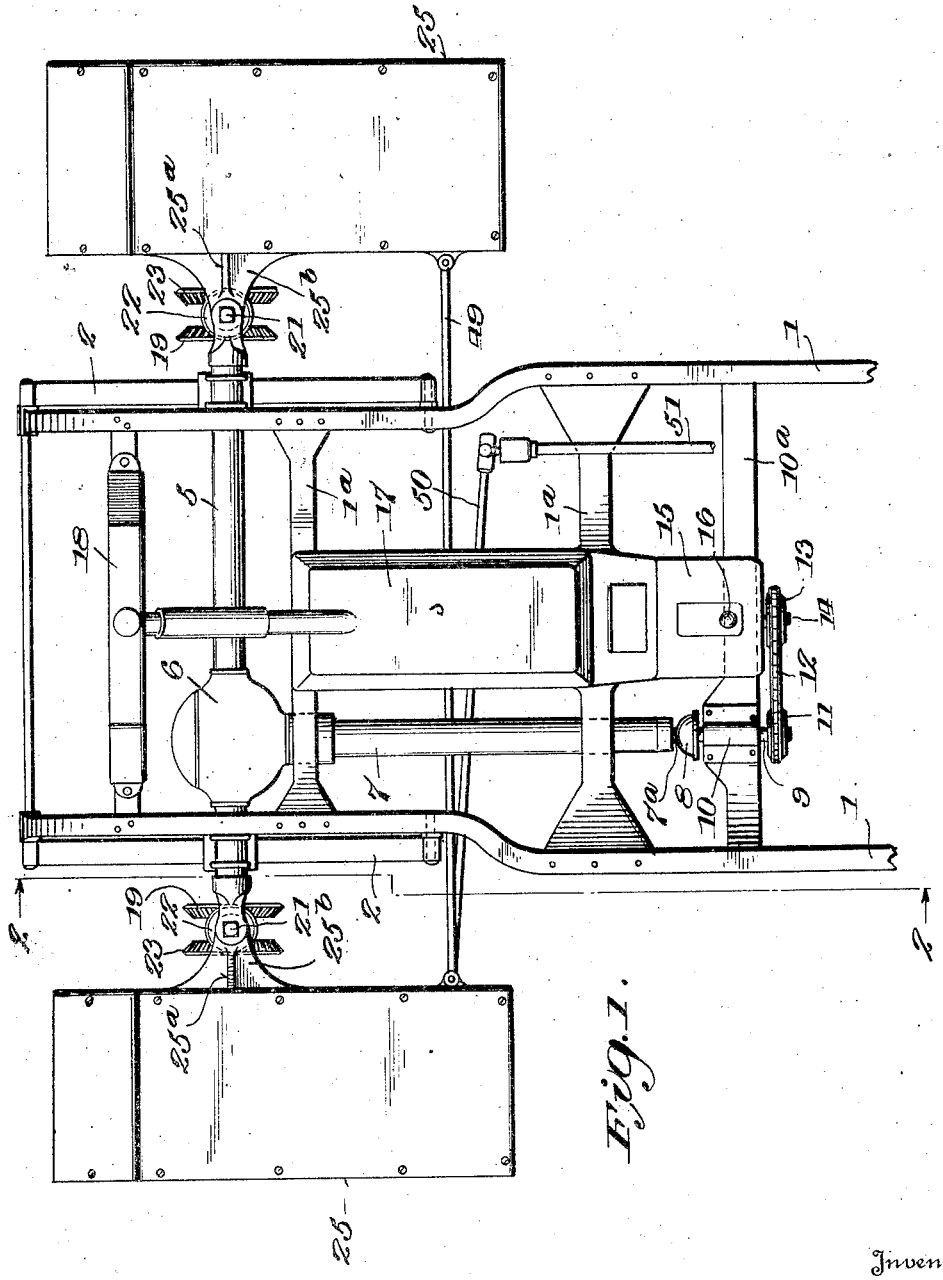
Inventor
Louis Perilli,
By Prentiss, Stone & Boyden,
Attorneys April 3, 1928. 1,664,570
L. PERILLI
PROPELLING MECHANISM FOR VEHICLES
Original Filed Sept. 15, 1923  4 Sheets-Sheet 2
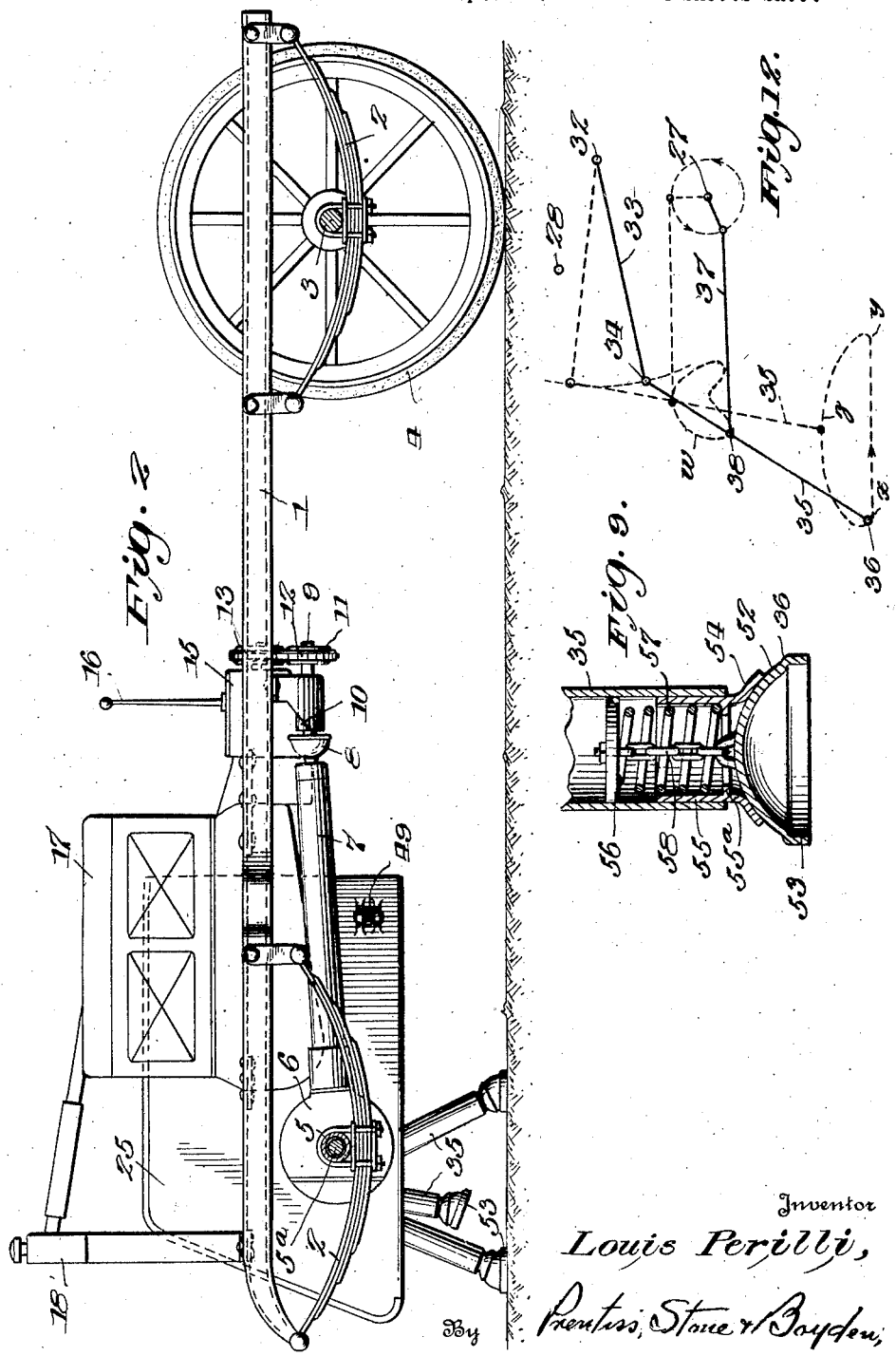
Inventor
Louis Perilli,
By Prentiss, Stone & Boyden,
Attorneys April 3, 1928.
L. PERILLI
1,664,570
PROPELLING MECHANISM FOR VEHICLES
Original Filed Sept. 15, 1923   4 Sheets-Sheet 3
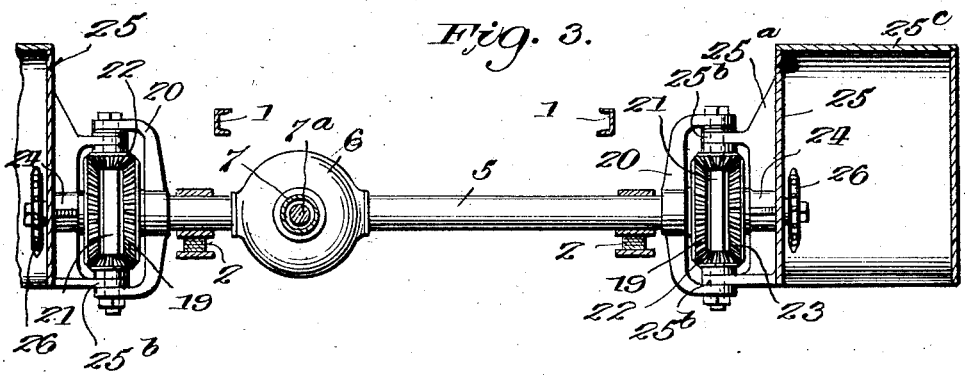
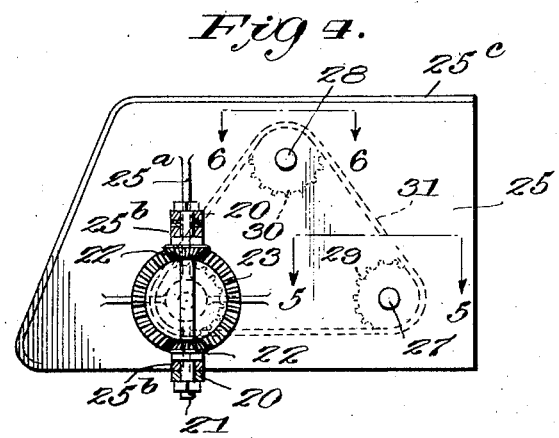
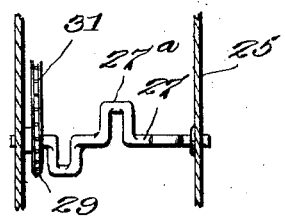
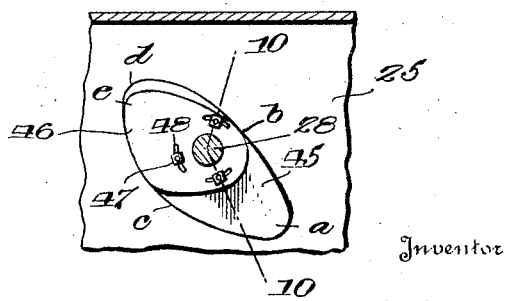
Inventor
Louis Perilli,
By Prentiss, Stone & Boyden,
Attorneys

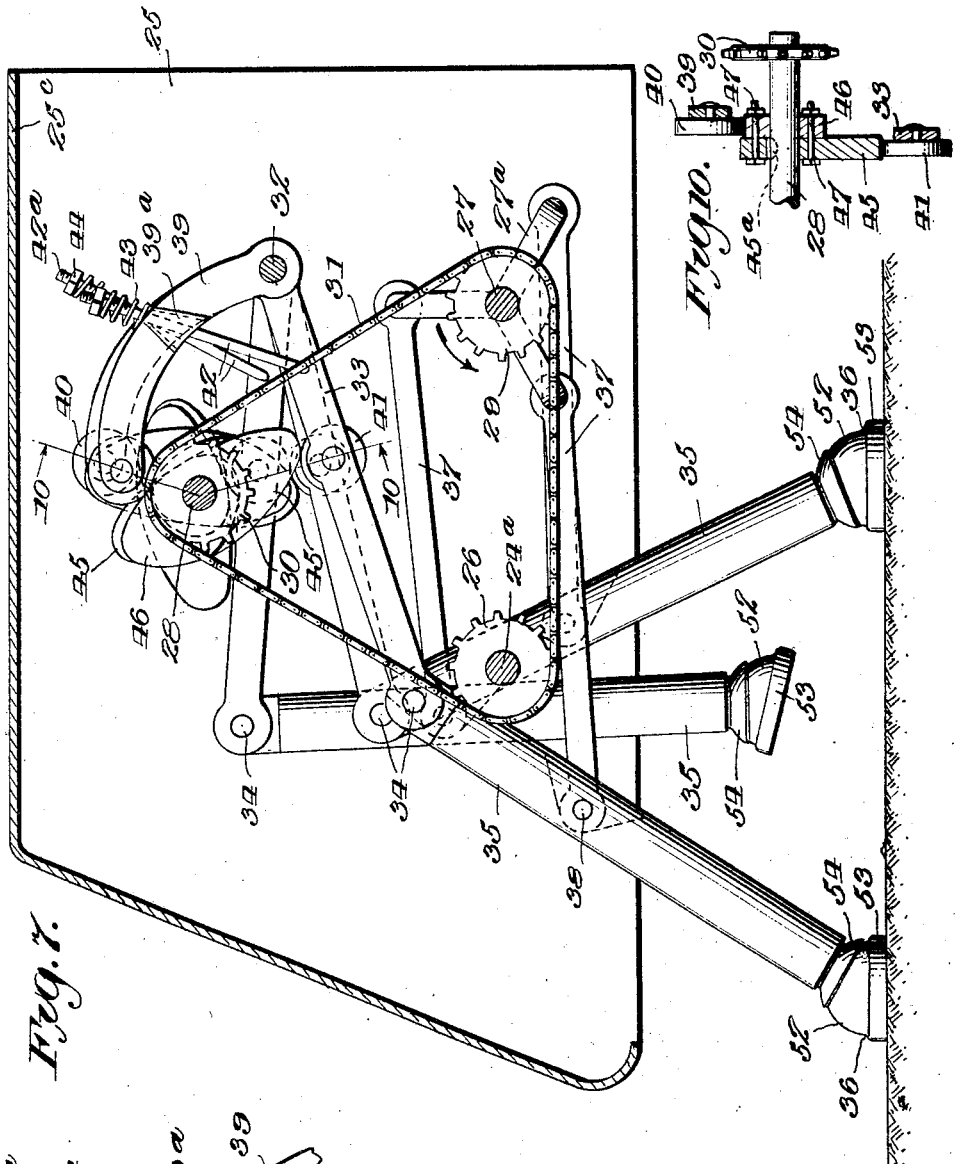

Patented Apr. 3, 1928.

1,664,570

UNITED STATES PATENT OFFICE.

LOUIS PERILLI, OF PORTSMOUTH, NEW HAMPSHIRE.

PROPELLING MECHANISM FOR VEHICLES.

Application filed September 15, 1923, Serial No. 662,850. Renewed July 26, 1927.

This invention relates to motor vehicles, and more particularly to a substitute for the usual wheels for supporting and propelling the vehicle.

The specific wheel substitute which this invention provides is in the nature of steppers comprising legs and feet, and associated with mechanism for operating the same in such manner as to produce a walking movement closely simulating that of living animals.

Among the objects of the invention are to provide improved means for steering a motor vehicle equipped with such stepping mechanism; to construct a stepper operating mechanism so designed as to compensate for the rising and falling motion due to the swinging movement of the legs about their pivots, and to maintain the vehicle frame substantially at a constant level as it is propelled; to provide improved means for transmitting power from the motor to the steppers, such means including a live axle and differential; and to devise an improved construction of foot, and method of connecting the same to the leg, whereby said foot is cushioned and also will readily adapt itself to the irregularities of the surface over which the machine is traveling.

With the above and other objects in view, the invention consists in the construction and arrangement of parts hereinafter described and claimed, and illustrated, by way of example, in the accompanying drawings, in which:—

Figure 1 is a partial plan view of a motor vehicle chassis equipped with my improved supporting and propelling mechanism;

Figure 2 is a sectional elevation of the complete vehicle chassis along the line 2—2 of Figure 1;

Figure 3 is a rear elevation of my improved front axle and associated parts, the transmission shaft and the stepper housings being shown in section, but the stepper mechanism being omitted for the sake of clearness;

Figure 4 is a vertical section through one of the swivel joints at the end of the axle shown in Figure 3, looking outwardly toward the stepper housing, the stepper driving mechanism being shown in dotted lines;

Figure 5 is a sectional plan view on the line 5—5 of Figure 4, parts being omitted;

Figure 6 is a sectional plan view on the line 6—6 of Figure 4, parts being omitted;

Figure 7 is a side elevation on an enlarged scale of one complete set of steppers and the operating mechanism therefor, the housing and shafts being shown in section;

Figure 8 is a side elevation of one of the pairs of cams shown in Figure 7;

Figure 9 is a vertical sectional view on an enlarged scale of the lower end of one of the stepper legs showing the foot construction;

Figure 10 is a fragmentary section on the line 10—10 of Figures 7 and 8, looking in the direction of the arrows, parts being omitted for the sake of clearness;

Figure 11 is an enlarged fragmentary detail of part of the mechanism shown in Figure 7; and Figure 12 is a diagram illustrating the movements of one element of the stepper mechanism.

Referring to the drawings in detail, the motor vehicle comprises the usual chassis, having the side frames 1 connected by suitable cross bars 1ª. This chassis is supported in any desired manner on springs 2 carried by a rear axle 3 and a front axle 5. Mounted on the rear axle are wheels 4 of any desired construction, or, in some cases, the rear end of the chassis may be supported upon sled runners.

The front axle, in my improved construction, comprises a hollow fixed housing 5, within which is journaled a live axle 5ª. This live axle is formed in two sections with differential mechanism interposed between them, such mechanism being enclosed within a differential housing 6. Extending rearwardly from the differential housing 6 is the transmission shaft housing 7 within which turns a transmission shaft 7ª (see Figure 3). At its rear end this shaft is connected by means of a universal joint 8 with a short shaft 9 journaled in bearings 10 carried by a cross bar 10ª of the chassis frame, and to the rear of the short shaft 9 is rigidly secured a sprocket wheel 11.

A sprocket chain 12 engages this wheel 11, and also passes around a sprocket wheel 13, secured to the end of a shaft 14 protruding from a change speed or transmission box 15. The usual gear shifting lever 16 is provided by means of which various speeds may be obtained. Just forward of the transmission box 15 is the engine or motor 17, suitably connected to a radiator 18, mounted as usual at the front of the chassis.

To the end of each section of the live axle 5ª is rigidly secured a bevel gear 19 which works between the forks of a yoke 20 rigidly secured to the end of the axle housing 5.

Passing through this yoke is a vertical spindle or pivot pin 21, and on this spindle are journaled a pair of bevel pinions 22 meshing with the gear 19 at opposite sides thereof.

Also pivoted upon the pin or spindle 21 at a point between the arms of the yoke 20 and outside of the pinions 22, are lugs or hinge members 25ᵇ projecting from strengthening ribs or fins 25ª formed on the side wall of a frame or housing 25, in which the stepper mechanism hereinafter described is located.

Journaled in bearings 24, carried by this housing or frame 25, is a stub shaft 24ª (see Figure 7), on one end of which is rigidly secured a bevelled gear 23 similar to the gear 19 and meshing with the two bevelled pinions 22. On the other end of the stub shaft 24ª which projects into the housing 25 is mounted a sprocket wheel 26 which furnishes the power for driving the stepper mechanism. It will thus be seen that by virtue of the construction just described, the frame or housing 25 can swing about the pin or spindle 21 as a center without in any way interfering with the continuous transmission of power from the live axle 5ª to the sprocket wheel 26.

It will be understood that a housing 25, sprocket wheel 26, and associated mechanism is provided at both ends of the front axle housing 5, as clearly shown in Figure 1, so that a set of steppers and operating mechanism therefor is symmetrically disposed at each side of the vehicle.

Referring now more particularly to Figures 4 to 8, it will be seen that in addition to the stub shaft 24ª, there are journaled in each housing 25, a crank shaft 27 and a cam shaft 28. On these two shafts are rigidly mounted sprocket wheels 29 and 30, of identically the same number of teeth, and around the three sprockets 26, 29 and 30, extends a chain 31, by means of which said shafts are geared together, and the shafts 27 and 28 driven in synchronism.

Also extending between the opposite walls of the housing 25 is a fixed rod or shaft 32. On this rod is pivotally mounted one end of a series of three similar arms or levers 33, and to the free ends of each of these levers is pivotally secured, as at 34, the upper end of a rigid stepper leg 35. To the lower end of each leg 35 is attached a foot 36 adapted to engage the ground, the construction of which foot will be hereinafter described in detail.

Pivotally connected to each leg 35, at a point 38, a considerable distance below the pivot 34, is one end of a link 37, the other end of which is journaled upon a crank 27ª carried by the shaft 27. By reference to the drawings it will be understood that the three cranks are set 120 degrees apart, so that the three legs 35 are operated in sequence.

Also pivoted on the rod 32, and arranged one adjacent each lever arm 33, are a series of lifter arms 39 carrying at their free ends rollers 40. Similar rollers 41 are journaled in the arms 33 at a point directly below the rollers 40.

By reference to Figure 7, it will be seen that the rollers 40 and 41 are disposed on opposite sides of the cam shaft 28, and secured to this cam shaft are a series of pairs of cams with which the rollers engage. Each pair comprises a large cam 45 which I will call the hold-down cam, and a smaller cam 46 which I will call the lifter cam. From an inspection of Figure 10, it will be seen that the rollers 40 and 41 are not in the same plane, but are slightly offset relative to each other, the roller 41 engaging the periphery of the cam 45, and the roller 40 engaging the periphery of the cam 46.

Each cam 45 is keyed to the shaft 28, as indicated at 45ª in Figure 10, and each cam 46 is loose on said shaft, but is rigidly and adjustably secured to the corresponding cam 45 by means of bolts 47 passing through the two cams and working in arcuate slots 48 formed in the cam 46. Thus the two cams are forced to rotate together, but their angular relative position may be slightly varied as required, by loosening the bolts 47, shifting the cam 46 to the necessary extent, and then tightening up the bolts again.

Each lifter arm 39 is connected with its corresponding arm 33, by means of a link rod 42, the lower end of which is bent at right angles and pivoted to the arm 33, and the upper end of which passes loosely through a boss 39ª formed in the arm 39, and a helical spring 43 is interposed between said boss and a nut 44 which works upon the threaded end 42ª of the rod 42. This spring 43 provides a yielding connection between the arms 39 and 33, so that any slight irregularity in the contour or setting of the cams will be taken care of and will not tend to over-strain or damage the mechanism, as might be the case if the rollers 40 and 41 were maintained rigidly at a fixed distance apart.

Figure 6 shows how the three pairs of cams are mounted upon the cam shaft 28, the respective pairs being angularly displaced around the shaft in a manner corresponding to the disposition of the cranks 27ª around the crank shaft 27, that is to say, 120 degrees apart.

By reference to Figure 8, it will be seen that each of the hold-down cams 45 is of elongated form and comprises two high portions $a$ and $d$, the portion $a$ being of somewhat longer radius than the portion $d$. Intermediate the points $a$ and $d$ on one side is the extreme low point $b$ of the cam, while the opposite side of the cam is cut to a smooth curve $c$, the middle point of which is at a considerably less radial distance from the shaft than the high points $a$ and $d$. The purpose of this will appear from the following description of the operation.

Power transmitted from the motor through the differential and live axle to the sprocket wheels 26 is in turn imparted to the shafts 27 and 28 by means of the chain 31, and these shafts are caused to revolve in unison. Figure 7 shows the position of the parts just after the high point of the cam 45 has passed the roller 41 of the stepper unit next to the observer, the direction of rotation of the shafts being as indicated by the arrow. At this moment the leg of this stepper unit is extended forwardly as shown, with the foot resting upon the ground, and is about to make its backward or working stroke. The leg is, of course, pulled backward by the crank 27ª acting through the link 37, and as it moves rearwardly, it of course swings about the pivot 34.

Were the curve $a\,c\,d$ in Figure 8 a true arc of a circle with the shaft 28 as a center, it is obvious that as the cam 45 revolves in a counter clockwise direction from the position shown in Figure 7, the roller 41, and consequently the pivot point 34, would be maintained at a constant distance from the shaft 28, or, in other words, would be held stationary, and in this event an up and down motion would be imparted to the vehicle frame by reason of the arcuate swinging movement of the leg 35 about the pivot 34. It is for the purpose of avoiding this up and down movement that the curve $a\,c\,d$ is flattened as shown in Figure 8, the extent to which this curve varies from a true circular arc being so proportioned as to compensate for the arcuate movement of the foot of the stepper. In other words, as the stepper moves rearwardly, impelled by the crank shaft, the arm 33 is permitted by the cam 45 to rise just sufficiently to maintain the shaft 48 and the vehicle frame at a constant level and to prevent any up and down movement thereof.

Or, considering the matter from a different view point, reference is had to Figure 12. Assuming that the vehicle is supported so that the stepper feet are off the ground, then, when the mechanism shown in Figure 7 operates, each stepper unit will move somewhat in the manner shown in dotted lines in Figure 12. The full lines in this figure correspond with the position of the parts as shown in Figure 7. As the mechanism operates, the arm 33 will swing from full lines to dotted line position. The point 34 will describe an arc as shown, while the pivot point 38 will move in some such irregular path as indicated by the dotted curve $w$. The essential thing, however, is that the foot of the stepper will move in some such path as indicated by the dotted curve $x\,y\,z$, and it will be particularly noted that the portion $x\,y$ of this path, which corresponds to the working stroke of the stepper foot, is substantially a straight horizontal line, instead of an arc.

From the above it will be understood that each stepper unit 35 moves from the position shown in full lines in Figure 12 backward to the point $y$, pulling the vehicle forward in a straight line. At the point $y$ the stepper foot is lifted by the lifter cam 46 operating upon the roller 40 and arm 39, and is returned through the air to the starting point, describing some such curve as indicated at $z$, the exact shape of this curve being more or less immaterial, and being determined by the profile of the portion $a\,b\,d$ of the cam 45, as well as the contour of the cam 46. In other words, the lifter cam and arm serve to maintain the roller 41 in contact with the periphery of the cam 45 at all times, the cam 45 serving during the working stroke to hold down the stepper foot upon the ground and to sustain the weight of the vehicle, and the low point thereof on the side $b$ serving to determine the height to which the foot is lifted by the lifter cam 46 during the idle or return stroke of the stepper.

It will also be understood that in each three unit stepper as shown in Figure 7, one leg engages the ground at the forward end of the stroke as another leg is about to leave the ground at the rear end of its stroke, and while a third leg is suspended in mid-air in the act of making its return stroke. Thus the weight of the vehicle is sustained by one of the three legs at all times, and, since as shown above, the lower end of each leg or foot moves in a straight line during its working stroke, the vehicle is smoothly propelled forward without any appreciable rising and falling movement.

In order to enable the operator to steer the vehicle, the stepper housings or frames 25 are pivotally connected by means of a rod 49, as clearly shown in Figure 1, and are also connected by means of a link 50 with the usual steering gear 51, such as is commonly employed in motor vehicles of the wheeled type. By means of this steering gear and the connections described, the housings 25 may be swung about the pivots or spindles 21 so as to guide the machine to the right or to the left, as may be desired.

A secondary, but important feature of the invention resides in the construction of the stepper foot itself. It is desirable that this foot should be so constructed as to adapt itself to any agle which the surface over which it is traveling may assume. To this end, I construct the foot with an annular ring or flange 53 (see Figure 9) adapted to engage the ground and with a dome-shaped or spherical body or top 52. The lower end of the leg 30 is made hollow and carries a socket member 54 shaped to receive the spherical surface 52 of the foot, such socket member being provided with a portion 55 which is slidably mounted in the hollow open end of the leg. To provide smooth action the leg is yieldably supported on the foot by means of a spring 57 enclosed within the hollow portion of the leg and interposed betweeen a fixed partition or wall 56, and a flange 55ª formed in the inside of the portion 55 of the socket member. In order to limit the outward movement of the foot and prevent separation of the parts, I connect the foot to the partition 56 by means of a chain 58 or other flexible connection. By virtue of this construction, it will be seen that the foot is free to partake of a universal pivotal movement relative to the leg and can thus adjust itself to whatever angle the surface over which it is traveling may present. At the same time the leg is yieldably supported on the foot so as to form a cushion to prevent jolts and jars when traveling over a hard surface. If desired rubber pads may be used on the feet, or, when the machine is employed for traveling over ice or the like, the feet may be provided with sharp points or calks.

It will be observed that the construction is such that two of the steppers of each group will be in supporting position at the start and finish of each step, thus insuring a broad support for the vehicle.

What I claim is:

1. The combination with a vehicle, of means for propelling the same, comprising a group of three steppers at each side of the vehicle, means for oscillating the same, and means for so shifting each stepper as it oscillates that the end thereof maintains a substantially constant distance from the vehicle frame during the working stroke, said means being constructed so as to hold two of each group of steppers in contact with the ground at the start and finish of each step.

2. The combination with a vehicle, of means for propelling the same, comprising a group of three steppers at each side of the vehicle, movable supports to which the upper ends of said steppers are pivoted, means for oscillating said steppers about such pivots, and means, operating as the steppers oscillate, for vertically shifting said supports said means being constructed so as to hold two of each group of steppers in contact with the ground at the start and finish of each step.

3. The combination with a vehicle, of means for propelling the same, comprising a group of three steppers at each side of the vehicle, movable supports to which the upper ends of said steppers are pivoted, means for oscillating said steppers about such pivots, and means, operating as the steppers oscillate, for vertically shifting said supports to such an extent as to cause the lower end of the steppers to move in a substantially straight horizontal line, said means being constructed so as to hold two of each group of steppers in contact with the ground at the start and finish of each step.

4. The combination with a vehicle, of means for propelling the same and sustaining one end thereof comprising a plurality of steppers, movable supports to which the upper ends of said steppers are pivotally connected, means for oscillating said steppers on their pivots, and cam means for shifting said supports up and down as the steppers are oscillated, said cam means embodying for each stepper a hold-down cam, a lifter cam, a lifter arm having a roller working on said lifter cam, and spring devices for coupling said lifter arm to its companion support.

5. The combination with a vehicle, of means for propelling the same and sustaining one end thereof comprising a plurality of steppers, pivoted arms to which the upper ends of said steppers are connected, a cam shaft, a plurality of cams on said shaft against which cams said arms bear so as to support the weight of the vehicle, cam-actuated lifter means resiliently connected to each of said arms, and means for oscillating said steppers and simultaneously operating said cam shaft.

6. The combination with a vehicle, of means for supporting and propelling the same comprising a plurality of steppers, pivoted arms to which said steppers are connected, a cam shaft, a hold-down cam and a lifting cam on said cam shaft for each stepper, said pairs of cams being operatively associated with each arm, the cams of each pair being differently shaped and relatively adjustable, and means for oscillating said steppers and simultaneously rotating said cam shaft.

7. The combination with a vehicle, of means for supporting and propelling the same comprising a plurality of pivoted steppers, means for oscillating said steppers, and cam means for raising and lowering the steppers as they are oscillated, said cam means comprising a pair of relatively adjustable cams for each stepper.

8. In a motor vehicle, a frame mounted on a vertical pivot at each side of one end thereof, a set of steppers carried by each frame for propelling and supporting the vehicle, means for driving said steppers, and means for turning said frames about their pivots to steer the vehicle.

9. In a motor vehicle, a frame mounted on a vertical pivot at each side of one end thereof, a set of steppers carried by each frame for propelling and supporting the vehicle, and operating mechanism for the steppers also carried by each frame, said mechanism comprising a crank shaft, a cam shaft, and means for rotating said shafts.

10. In a motor vehicle, an axle structure comprising a housing and a live axle within the same, a frame having a pivotal connection with each end of the axle housing, a set of steppers and operating mechanism therefor mounted in each frame, and means for driving the said operating mechanism from said live axle through said pivotal connections.

11. In a motor vehicle, having a fixed axle, a frame or housing mounted at each end thereof on vertical pivots, steppers carried by each frame or housing for supporting and propelling the vehicle, means for driving said steppers, a link connecting said frames or housings for causing them to swing together on their pivots, and means for turning said frames or housings on such pivots for steering the vehicle.

In testimony whereof I affix my signature.

LOUIS PERILLI.